United States Patent Office 3,009,966
Patented Nov. 21, 1961

3,009,966
PRODUCTION OF FLUORINATED COMPOUNDS
Murray Hauptschein, Glenside, and Arnold H. Fainberg, Elkins Park, Pa., assignors to Pennsalt Chemicals Corporation, Philadelphia, Pa., a corporation of Pennsylvania
No Drawing. Filed Feb. 8, 1960, Ser. No. 7,128
16 Claims. (Cl. 260—653.5)

This invention relates to the conversion of fluoroform, $CF_3H$, to other fluorocarbons by pyrolysis.

Heretofore fluoroform had been considered to be an inert material both in thermal and other types of reactions. It has now been unexpectedly found that fluoroform may be converted to valuable fluorocarbons, especially perfluoroolefins, by subjecting it to pryolysis at high temperatures.

As will appear more in detail from the subsequent description, the advantages of the invention as applied to the manufacture of perfluoroolefins, particularly tetrafluoroethylene and perfluoropropene, are considerable. The starting material, fluoroform, is relatively inexpensive and readily available. It is converted to perfluoroolefins directly in a one step reaction at high rates and in excellent conversions and yields.

As applied to the production of perfluoropropene, the invention has particular advantages. Perfluoropropene is presently commercially produced by the pyrolysis of tetrafluoroethylene which is in turn produced by the pyrolysis of a saturated fluorocarbon, commonly $$CF_2HCl$$

In accordance with the invention perfluoropropene is produced in high conversions and yields directly from fluoroform in one step.

A further advantage of the invention is that fluorine values in the form of hydrogen fluoride are readily recoverable and reusable since hydrogen fluoride formed as a by-product of the pyrolysis is free from contamination with HCl which greatly simplifies its recovery and reuse.

By the term pyrolysis as used herein is meant a reaction which occurs essentially through the agency of heat and is intended to include thermal reactions which result in the breakdown of a molecule into smaller fragments and the recombination of these fragments into larger molecules. While the invention does not depend upon any particular theory of reaction mechanism, it is believed that the products produced in accordance with the invention result from the breakdown of fluoroform into free radicals under the influence of heat and the recombination of these free radicals to produce the observed products.

In accordance with the invention, it has been found that the pyrolysis may be carried out at temperatures ranging from about 700° C. to about 1500° C. and preferably from about 850° C. to 1300° C. At temperatures below 700° C., the reaction rate is low such that very little or no conversion of the fluoroform is obtained at practicable contact times; furthermore, if the contact time is increased to improve conversion, complex mixtures of products are obtained. At temperatures over 1500° C., the materials of construction for the reactor become prohibitively expensive and difficult to obtain. Furthermore, it becomes exceedingly difficult to control the reaction to produce the desired products because of the extremely short contact times that must be used. At practicable contact times, it becomes difficult to avoid excessive amounts of unwanted by-products and degradation products.

The choice of optimum temperature will depend upon the product desired and other conditions such as contact time and pressure as will be explained in more detail hereafter. In most cases, the optimum temperature for the production of tetrafluoroethylene and/or perfluoropropene will be of the order of 900° C. to 1200° C.

In connection with reaction temperature, it is a particularly surprising feature of the invention that high pyrolysis temperatures (such as 1100° C., for example) may be employed without producing relatively large quantities of degradation products and by-products. Normally, reaction temperature is a controlling factor in determining product distribution. In the present case, however, it has been found that by suitably reducing contact time and reaction pressure, as will appear more in detail from the following description, high temperatures may be employed (which produce a desirably high level of conversion at high throughput) while obtaining optimum yields of desired products.

It is preferred to carry out the pyrolsis by continuously passing fluoroform through a heated zone. Conveniently, the heated zone may be in the form of a hot tube heated to the desired temperature by electrical means or any other desired heating means. The tube should be constructed of materials resistant to oxidation and attack by the reactants or reaction products at the operating temperature. Preferred materials of this type include, for example, platinum lined tubes or nickel tubes.

Contact time is an important variable with respect to producing the optimum yields and conversions of desired products. Relatively short contact times should be used generally less than about 10 seconds and preferably less than one second. Preferred contact times for practical operation are generally in the range of from about 1 second to about 0.001 second, although even shorter contact times, e.g. 0.0001 second may be employed if desired, the lower limit being set only by practical considerations such as permissible flow rates and the desired conversion at a given temperature. The optimum contact time will vary with temperature and in general, the higher the temperature, the shorter should be the contact time for best results. By contact time is meant the residence time of the reactants in the heated zone, and may be expressed as follows:

Contact time in seconds

$$= \frac{\text{Volume of the heated zone}}{\text{Volume of gas per second (calculated at reaction temperature and pressure) fed to the heated zon}}$$

Pressure is also an important variable with respect to producing maximum yields of desired products. Although pressure is not critical in determining whether or not pyrolysis will take place, it may have an important effect upon the product distribution. Atmospheric, sub-atmospheric and super-atmospheric pressures may be employed. Usually pressures should not exceed about ten atmospheres. There is no critical lower limit of sub-atmospheric pressures that may be employed other than that set by practical consideration.

To obtain optimum yields and conversions of tetrafluoroethylene and/or perfluoropropene, pressures no higher than atmospheric (i.e. approximately 760 mm. Hg absolute), and particularly sub-atmospheric pressures, are highly preferred. It has been found that lower pressures favor the production of these materials as distinguished from other products such as perfluoroisobutylene. A preferred practical range of operating pressures for the production of these two olefins is from about 25 to about 300 mm. Hg absolute.

As the reaction pressure increases, there is a tendency to favor the production of products apparently resulting from the addition of hydrogen fluoride to olefins formed in the pyrolysis, for example, such products as $C_2HF_5$, $C_3HF_7$ and $C_4HF_9$. There is also a tendency with higher pressures to increase the production of higher olefins such as perfluoroisobutylene and other perfluorobutenes. If it is desired to maximize the yield of perfluorobutenes, somewhat higher pressures ranging, for example of from one atmosphere to ten atmospheres (absolute) may be preferred.

Although the reaction of the invention is essentially pyrolytic in character (i.e. results essentially from the application of heat), catalysts may be present in the reaction zone if desired. Depending on their nature, catalysts may to a greater or lesser extent alter the distribution of reaction products and/or the optimum conditions for carrying out the reaction. In its preferred form, the invention is carried out in the absence of catalysts, such as by passing the reactants through an unobstructed platinum-lined heated tube.

As previously mentioned, one of the salient advantages of the invention is that it provides a simple and economical method of obtaining high yields and conversions of tetrafluoroethylene and perfluoropropene directly from fluoroform. To obtain optimum yields and conversions of these two materials it is preferred to employ the combination of relatively high temperature (preferably temperatures from 900° to 1200° C.) short contact time (preferably contact times of from 0.5 to 0.001 second) and sub-atmospheric pressure (preferably from 25 to 300 mm. Hg absolute). Relatively high temperatures are preferred in order to increase the rate of reaction (and therefore the conversion per pass). Short contact time and sub-atmospheric pressure are preferred since it has been found that these conditions maximize the yield of these two products and minimize the production of other products such as perfluoroisobutylene.

When the process is operated to produce maximum yields of tetrafluoroethylene and/or perfluoropropene at relatively good rates of conversion per pass through the reactor, it has been found that the fluoroform is converted into a mixture of tetrafluoroethylene and perfluoropropene, the ratio of these two products from the fluoroform pyrolysis being subject to control by varying the conditions of the reaction as will be apparent from the examples that follow.

When it is desired to produce maximum yields of perfluoropropene, it has been found that the tetrafluoroethylene simultaneously produced in the initial pyrolysis of fluoroform may be recycled along with unconverted fluoroform to the reactor and there converted in good yields to additional perfluoropropene such that overall yields of perfluoropropene from the starting fluoroform of the order of e.g. 80% to 95% may be obtained, along with minor amounts of higher perfluoroolefins as the only with minor amounts of higher perfluoroolefins as the only significant by-products. $C_2HF_5$ ordinarily produced in very minor amounts may also be recycled to the reactor. Thus, to produce maximum yields of perfluoropropene, the reactor effluent consisting essentially of hydrogen fluoride, perfluoropropene, tetrafluoroethylene and unconverted fluoroform, and often small amounts of higher perfluoro-olefins is treated to recover (e.g. by distillation) a mixture of tetrafluoroethylene and fluoroform, which is recycled to the reactor together with fresh fluoroform feed. Perfluoropropene may be separated and purified by distillation.

For the production of maximum yields of tetrafluoroethylene reaction conditions are preferably adjusted to produce a maximum one-pass yield of tetrafluoroethylene at practicable conversion levels; the tetrafluoroethylene produced is separated as product; fluoroform is separated for recycle to the reactor; and the remaining products are separated as by-products for any desired use. The major by-product in the production of maximum yields of tetrafluoroethylene will ordinarily be perfluoropropene.

Where it is desired to obtain maximum yields of higher olefins, such as perfluorobutenes, it will be generally found that somewhat higher pressures and longer contact times should be employed than in the case where maximum yields of tetrafluoroethylene and perfluoropropene are desired. Lower olefins such as $C_2F_4$ and $C_3F_6$ together with unreacted fluoroform may be recycled in this instance since these tend to be converted upon further pyrolysis to perfluorobutenes and other higher perfluoroolefins.

The following examples illustrate the invention.

EXAMPLES 1 TO 25

These examples illustrate the pyrolysis of fluoroform at atmospheric pressure (760 mm. Hg absolute) and at temperatures varying from 700° C. to 960° C. and at various contact times. These runs were carried out by passing fluoroform at atmospheric pressure through a platinum lined nickel tube 32 inches long having a 3/8 inch outside diameter and a 6 millimeter inside diameter. The tube is electrically heated and maintained at an average temperature as indicated in Table 1 over an estimated 9 inches of its length giving a reactor volume (volume at reaction temperature) of about 6.3 milliliters. The average temperature is taken as that recorded by a thermocouple attached to the outer surface of the tube at the center of the heated zone. The reaction products in gaseous form are passed through a hydrogen fluoride scrubber consisting of a tube packed with sodium fluoride in pellet form held at 80°–110° C. where the hydrogen fluoride is removed quantitatively, and then are collected in a series of receivers cooled in Dry Ice and liquid nitrogen. A gas sampling valve is included in the line between the hydrogen fluoride scrubber and the cooled receivers by means of which gas samples are fed at intervals to a gas-liquid partition chromatograph through which product analyses are made. From the product analyses percent conversion is determined on the assumption that two moles of fluoroform are consumed to produce one mole of a two carbon atom compound; three moles of fluoroform are consumed to produce one mole of a three carbon atom compound; four moles of fluoroform are consumed to produce one mole of a four carbon atom compound; etc. In Table 1 the results of twenty-five runs at various temperatures and contact times are shown. Hydrogen fluoride (removed by the hydrogen fluoride scrubber) is not reported in the table. From the weight gain of the scrubber, it is determined in these runs that approximately one mole of hydrogen fluoride is produced for each mole of fluoroform converted.

As these runs show, the percent conversion per pass at constant contact time increases with increasing temperature. Compare Examples 1 to 4, 6, 10, 15, 19 and 22 all carried out at contact times of about 0.5 to 0.6 second but at increasing temperature. As may be seen the conversion of fluoroform to other products during a single pass through the reactor increases from 0.2% at 700° C. (Example 1) to 80% at 960° C. (Example 22).

These examples also show the effect of contact time upon the yield of $CF_2=CF_2+CF_3CF=CF_2$ at constant temperature. Compare Examples 6–9 carried out at 860° C. but at decreasing contact times. As the contact time decreases from 0.5 to 0.2 second the yield of $$CF_2=CF_2+CF_3CF=CF_2$$

increases from 89% to 97% reflecting the fact that at shorter contact times smaller quantities of by-products such as perfluoroisobutylene are produced. Similarly, compare Examples 10 to 14 at 880° C.; Examples 15 to 18 at 900° C.; Examples 19 to 21 at 920° C. and Examples 22 to 25 at 960° C. As contact time decreases at constant temperature, the yield of $CF_2=CF_2$ plus $CF_3CF=CF_2$ increases in each case.

These examples further illustrate the effect of reaction conditions upon the ratio of products and specifically upon the ratio of tetrafluoroethylene to perfluoropropene. In general, at constant pressure and temperature, and decreasing contact time, the ratio of $$CF_2=CF_2:CF_3CF=CF_2$$

increases. Compare examples 6 to 9 at 860° C. and at contact times decreasing from 0.5 second to 0.2 second wherein the weight ratio of $CF_2=CF_2:CF_3CF=CF_2$ increases from 62:27 to 90:7. A similar relationship may be observed by comparing Examples 10 to 14 at 880° C.; Examples 15 to 18 at 900° C.; Examples 19 to 21 at 920° C.; and Examples 22 to 25 at 960° C.

increases from 800° C. in Example 26 to 1070° C. in Example 49, the conversion increases from 1.3% to 87.7%.

As in the previous examples, decreasing contact time at constant temperature increases the yield of $$CF_2=CF_2+CF_3CF=CF_2$$

as may be seen by comparing particularly Examples 49 to 53 at 1070° C. and Examples 54 to 57 at 1090° C.

Runs 26 to 57 show the same effect of decreasing contact time at constant temperature upon the ratio of $C_2F_4:C_3F_6$ as previously noted in connection with runs 1 to 25. Compare Examples 37 to 42 at 1000° C. where the weight ratio of $C_2F_4:C_3F_6$ increased from 73:25.4 to 98:2 as contact time decreased from 0.11 to 0.01 second. A similar trend may be seen by comparing Examples 43 to 48 at 1040° C.; Examples 49 to 53 at 1070° C. and Examples 54 to 57 at 1090° C.

The effect of reaction pressure at constant temperature and contact time upon the yield of $$CF_2=CF_2+CF_3CF=CF_2$$

*Table 1*

[Runs at atmospheric pressure]

| Example | Temperature, °C. | Contact time, seconds | Percent conversion of fluoroform to— | | | | | | | | Percent yield of— | | | |
|---|---|---|---|---|---|---|---|---|---|---|---|---|---|---|
| | | | Total | $C_2F_4$ | $C_2HF_5$ | $C_3F_8$ | $C_3F_6$ | $C_3HF_7$ | Perfluoro [1] $C_4$ compounds | Perfluoroisobutylene | $C_2F_4$ | $C_3F_6$ | $C_2F_4+C_3F_6$ | Perfluoroisobutylene |
| 1 | 700 | 0.6 | 0.2 | 0.2 | | | | | | | | | | |
| 2 | 750 | 0.6 | 1.9 | 1.9 | | | | | | | | | | |
| 3 | 800 | 0.6 | 7.0 | 6.2 | 0.2 | | 0.4 | 0.05 | 0.15 | | 89 | 6 | 95 | |
| 4 | 840 | 0.6 | 19.4 | 13.8 | 0.6 | | 3.6 | 0.2 | 1.0 | 0.2 | 71 | 19 | 90 | 1.0 |
| 5 | 840 | 0.3 | 8.6 | 7.6 | 0.3 | | 0.6 | | 0.1 | | 89 | 7 | 96 | |
| 6 | 860 | 0.5 | 27.1 | 16.8 | 0.9 | 0.04 | 7.3 | 0.15 | 1.4 | 0.5 | 62 | 27 | 89 | 1.8 |
| 7 | 860 | 0.4 | 20.2 | 15.0 | 0.5 | | 3.5 | 0.2 | 0.9 | 0.07 | 74 | 17 | 91 | 0.35 |
| 8 | 860 | 0.3 | 14.5 | 12.2 | | | 1.8 | 0.04 | 0.4 | 0.06 | 84 | 12 | 96 | 0.4 |
| 9 | 860 | 0.2 | 8.7 | 7.8 | 0.2 | | 0.6 | | 0.08 | | 90 | 7 | 97 | |
| 10 | 880 | 0.5 | 39.2 | 18.5 | 1.4 | 0.1 | 16.0 | 0.2 | 1.7 | 1.3 | 47 | 41 | 88 | 3.3 |
| 11 | 880 | 0.4 | 27.3 | 17.9 | 0.9 | 0.1 | 6.6 | 0.2 | 1.2 | 0.4 | 66 | 14 | 90 | 1.5 |
| 12 | 880 | 0.3 | 22.8 | 16.6 | 0.6 | | 4.3 | 0.1 | 0.9 | 0.3 | 73 | 19 | 92 | 1.3 |
| 13 | 880 | 0.2 | 12.7 | 10.8 | 0.3 | | 1.2 | 0.03 | 0.3 | 0.05 | 85 | 9.5 | 94.5 | 0.4 |
| 14 | 880 | 0.1 | 8.6 | 7.9 | 0.2 | | 0.4 | | 0.06 | | 92 | 5 | 97 | |
| 15 | 900 | 0.5 | 49.8 | 17.4 | 1.7 | 0.3 | 25.5 | 0.4 | 1.8 | 2.5 | 35 | 51 | 86 | 5.0 |
| 16 | 900 | 0.3 | 30.3 | 19.8 | 0.8 | Trace | 7.7 | 0.25 | 1.3 | 0.5 | 65 | 25 | 90 | 1.6 |
| 17 | 900 | 0.2 | 20.3 | 15.9 | 0.5 | Trace | 3.1 | 0.1 | 0.6 | 0.14 | 78 | 15 | 93 | 0.7 |
| 18 | 900 | 0.1 | 13.0 | 11.2 | 0.3 | | 1.1 | 0.03 | 0.3 | 0.1 | 86 | 8.5 | 94.5 | 0.8 |
| 19 | 920 | 0.5 | 60.2 | 14.7 | 2.1 | 0.4 | 35.7 | 0.6 | 1.8 | 4.7 | 24.5 | 59.5 | 84 | 7.8 |
| 20 | 920 | 0.3 | 40.1 | 21.7 | 1.2 | 0.1 | 14.1 | 0.3 | 1.5 | 1.2 | 54 | 35 | 89 | 3.0 |
| 21 | 920 | 0.1 | 19.4 | 15.6 | 0.5 | Trace | 2.7 | 0.1 | 0.4 | 0.1 | 80 | 14 | 94 | 0.5 |
| 22 | 960 | 0.5 | [2] 80.0 | 4.4 | 2.0 | 0.8 | 49.2 | 0.3 | 4.7 | 14.8 | 5 | 61 | 66 | 18 |
| 23 | 960 | 0.3 | 67.2 | 24.4 | 1.7 | 0.5 | 33.7 | 0.5 | 1.9 | 4.4 | 36 | 50 | 86 | 6.6 |
| 24 | 960 | 0.12 | 37.9 | 24.0 | 1.0 | 0.08 | 10.9 | 0.24 | 1.1 | 0.7 | 63 | 29 | 92 | 1.8 |
| 25 | 960 | 0.08 | 22.1 | 17.8 | 0.5 | 0.05 | 3.2 | 0.1 | 0.3 | 0.2 | 80.5 | 14.5 | 95 | 0.9 |

[1] May include cis and trans $CF_3CF=CFCF_3$ and/or cyclic $C_4F_8$ but excludes perfluoroisobutylene.
[2] 3.4% $C_2F_6$ obtained in this run.

EXAMPLES 26 TO 57

These examples illustrate the pyrolysis of fluoroform at 100 mm. Hg absolute and at temperatures varying from 800° C. to 1090° C. and at various contact times. These runs were carried out by passing fluoroform through the system described in connection with Examples 1 to 25. The reactor and the product handling system including the cooled receivers, and hydrogen fluoride scrubber are maintained at a reduced pressure of about 100 mm. Hg. Product analyses and conversions are determined as described in connection with Examples 1 to 25. In Table 2 the results of 32 runs at various temperatures and contact times are shown.

These runs illustrate the same general relationships between the product variables as shown by Examples 1 to 25. The percent conversion per pass at constant contact time increases with increasing temperature as may be seen by comparing Examples 26, 27, 29, 30, 33, 37, 43 and 49, all carried out at approximately the same contact time (.10 to .13 second). As the temperature may be seen by comparing Examples 1 to 25 at atmospheric pressure with Examples 26 to 57 at 100 mm. Hg. Compare for example, Example 21 at 920° C., atmospheric pressure and a contact time of 0.1 second with Example 30 at the same temperature and contact time but at 100 mm. Hg pressure. A yield of 94%

$$CF_2=CF_2+CF_3CF=CF_2$$

in Example 21 increases to approximately 100% yield in Example 30 at the lower pressure. Similarly, compare Example 24 at 960° C. atmospheric pressure, and contact time of 0.12 second with Example 33 at the same temperature contact time but at 100 mm. Hg. At the lower pressure of Example 33, a yield of $$CF_2=CF_2+CF_3CF=CF_2$$

of 99.6% is obtained with only 0.1% perfluoroisobutylene whereas, at the higher pressure in Example 24 the yield of the former two materials drops to 92% with a 1.8% yield of perfluoroisobutylene.

Table 2

[Runs at 100 mm. Hg]

| Example | Temperature, °C. | Contact time, seconds | Percent conversion of fluoroform to— | | | | | | | | | Percent yield of— | | | |
|---|---|---|---|---|---|---|---|---|---|---|---|---|---|---|---|
| | | | Total | $C_2F_6$ | $C_2F_4$ | $C_2HF_5$ | $C_3F_8$ | $C_3F_6$ | $C_3HF_7$ | Perfluoro-$C_4$ compounds [1] | Perfluoro-isobutylene | $C_2F_4$ | $C_3F_6$ | $C_2F_4+C_3F_6$ | Perfluoro-isobutylene |
| 26 | 800 | 0.13 | 1.3 | | 1.3 | | | | | | | | | | |
| 27 | 840 | 0.12 | 3.9 | | 3.9 | 0.02 | | | | | | | | | |
| 28 | 840 | 0.09 | 1.6 | | 1.6 | | Trace | Trace | | | | | | | |
| 29 | 880 | 0.12 | 6.9 | | 6.8 | | | 0.1 | | | | 98 | 2 | [2] 100 | |
| 30 | 920 | 0.12 | 15.4 | | 14.8 | | | 0.5 | | | | 96 | 4 | [2] 100 | |
| 31 | 920 | 0.09 | 11.3 | | 10.7 | Trace | Trace | 0.6 | Trace | | | 95 | 5 | [2] 100 | |
| 32 | 920 | 0.05 | 5.8 | | 5.6 | | | 0.2 | | | | 96 | 4 | [2] 100 | |
| 33 | 960 | 0.11 | 32.0 | | 27.6 | 0.07 | 0.05 | 4.3 | | | 0.03 | 86.2 | 13.4 | 99.6 | 0.1 |
| 34 | 960 | 0.05 | 14.5 | | 13.9 | Trace | Trace | 0.6 | | Trace | Trace | 96 | 4 | [2] 100 | |
| 35 | 960 | 0.03 | 9.5 | | 9.3 | | | 0.2 | | | | 98 | 2 | [2] 100 | |
| 36 | 960 | 0.02 | 6.4 | | 6.2 | | | 0.2 | | | | 97 | 3 | [2] 100 | |
| 37 | 1,000 | 0.11 | 53.5 | | 39.0 | | 0.1 | 13.6 | | 0.2 | 0.6 | 73 | 25.4 | 98.4 | 1.1 |
| 38 | 1,000 | 0.07 | 38.6 | | 32.7 | | 0.05 | 5.7 | | 0.06 | 0.12 | 84.8 | 14.7 | 99.5 | 0.3 |
| 39 | 1,000 | 0.05 | 29.0 | | 26.6 | Trace | Trace | 2.4 | | Trace | Trace | 92 | 8 | [2] 100 | |
| 40 | 1,000 | 0.03 | 19.6 | | 18.6 | Trace | Trace | 1.0 | | Trace | Trace | 95 | 5 | [2] 100 | |
| 41 | 1,000 | 0.02 | 15.2 | | 14.6 | Trace | Trace | 0.6 | | | | 96 | 4 | [2] 100 | |
| 42 | 1,000 | 0.01 | 4.6 | | 4.5 | Trace | Trace | 0.1 | | | | 98 | 2 | [2] 100 | |
| 43 | 1,040 | 0.11 | 74.1 | | 41.9 | | 0.2 | 29.0 | | 0.7 | 2.2 | 56.5 | 39.2 | 95.7 | 3.0 |
| 44 | 1,040 | 0.07 | 59.0 | 1.4 | 42.5 | | 0.1 | 14.1 | | 0.3 | 0.5 | 72.1 | 23.9 | 96.0 | 0.9 |
| 45 | 1,040 | 0.05 | 50.5 | | 40.2 | | 0.1 | 9.6 | | 0.2 | 0.3 | 79.7 | 19.0 | 98.7 | 0.6 |
| 46 | 1,040 | 0.03 | 35.1 | | 31.6 | | 0.05 | 3.4 | | 0.03 | | 90 | 9.7 | 99.7 | |
| 47 | 1,040 | 0.02 | 29.3 | | 27.0 | Trace | Trace | 2.3 | | Trace | Trace | 92 | 8 | [2] 100 | |
| 48 | 1,040 | 0.01 | 8.4 | | 8.0 | Trace | Trace | 0.4 | | | | 95 | 5 | [2] 100 | |
| 49 | 1,070 | 0.10 | 87.7 | 6.0 | 34.4 | | 0.3 | 41.2 | | 1.4 | 4.4 | 39 | 47 | 86 | 5.0 |
| 50 | 1,070 | 0.07 | 74.6 | 3.3 | 45.8 | 0.06 | 0.2 | 23.4 | | 0.4 | 1.4 | 61 | 31 | 92 | 1.9 |
| 51 | 1,070 | 0.05 | 60.8 | 2.1 | 48.0 | 0.07 | 0.1 | 9.7 | | 0.1 | 0.6 | 79 | 16 | 95 | 0.8 |
| 52 | 1,070 | 0.03 | 47.8 | | 40.7 | 0.06 | 0.07 | 6.7 | | 0.08 | 0.15 | 85.2 | 14.0 | 99.2 | 0.3 |
| 53 | 1,070 | 0.02 | 40.4 | | 36.0 | 0.03 | 0.02 | 4.3 | | 0.04 | 0.03 | 89.2 | 10.5 | 99.7 | 0.1 |
| 54 | 1,090 | 0.06 | 89.4 | 8.8 | 38.4 | 0.03 | 0.15 | 36.8 | | 1.5 | 3.7 | 43 | 41 | 84 | 4.1 |
| 55 | 1,090 | 0.05 | 85.1 | 5.5 | 40.6 | 0.06 | 0.30 | 35.6 | | 1.1 | 1.9 | 48 | 42 | 90 | 2.2 |
| 56 | 1,090 | 0.03 | 71.3 | 3.2 | 48.3 | 0.08 | 0.20 | 18.3 | | 0.4 | 0.8 | 68 | 26 | 94 | 1.1 |
| 57 | 1,090 | 0.02 | 58.2 | | 46.6 | 0.10 | 0.20 | 10.7 | | 0.2 | 0.4 | 80.1 | 18.4 | 98.5 | 0.7 |

[1] May include cis and trans $CF_3CF=CFCF_3$ and/or cyclic $C_4F_8$ but excludes perfluoroisobutylene.
[2] Includes traces of other materials.

EXAMPLE 58

In this example fluoroform is passed at atmospheric pressure through a nickel tube 32 inches long having an inside diameter of 7 millimeters. The tube is electrically heated and maintained at an average temperature of 920° C. over an estimated 9 inches of its length giving a reactor volume of 8.1 milliliters. Reaction products are passed through a hydrogen fluoride scrubber to remove HF and then to cooled receivers as described in the previous examples. Product analyses and conversions are determined as previously described. At a contact time of 0.6 second, a total conversion of 63.5% of fluoroform to products was obtained distributed as follows:

| Product | Percent conversion | Percent yield |
|---|---|---|
| $CF_2=CF_2$ | 10.6 | 16.7 |
| $C_2HF_5$ | 2.3 | 3.6 |
| $C_3F_8$ | 0.7 | 1.1 |
| $CF_3CF=CF_2$ | 40.3 | 63.4 |
| $CF_2=CF_2+CF_3CF=CF_2$ | 30.8 | 80.1 |
| $C_3HF_7$ | 0.6 | 1.0 |
| Perfluoro $C_4$ compounds | 2.2 | 3.5 |
| Perfluoroisobutylene | 6.8 | 10.7 |

EXAMPLE 59

Fluoroform is passed through a nickel tube 32 inches long having an inside diameter of 7 millimeters and then into a product recovery system as previously described. A 12 inch section of the tube adjacent the fluoroform source is electrically heated and serves to preheat the gases to a temperature of approximately 900° C. A second section of the tube down-stream from the preheater is electrically heated and maintained at an average temperature of approximately 1100° C. over an estimated 6 inches of tube length, giving a reactor volume (volume at 1100° C.) of about 5.4 millimeters. The entire system including product receivers, the reaction zone and preheater is maintained at a pressure of approximately 100 mm. Hg. Hydrogen fluoride is removed by a hydrogen fluoride scrubber as previously described. Product analyses and conversions are determined as previously described. At a contact time of 0.03 second, a total conversion of fluoroform to products of 72.3% was obtained distributed as follows:

| Product | Percent conversion | Percent yield |
|---|---|---|
| $CF_2=CF_2$ | 52.1 | 72.1 |
| $C_2HF_5$ | 0.3 | 0.4 |
| $C_3F_8$ | 0.2 | 0.3 |
| $CF_3CF=CF_2$ | 15.7 | 21.7 |
| $CF_2=CF_2+CF_3CF=CF_2$ | 67.8 | 93.8 |
| Perfluoro $C_4$ compounds | 0.6 | 0.8 |
| Perfluoroisobutylene | 0.9 | 1.2 |
| $C_2F_6$ | 2.5 | 3.5 |

EXAMPLE 60

Fluoroform is passed through the same system as in Example 59 using the same procedures and reaction conditions except that a slightly higher temperature is used in the second heated section of the tube (approximately 1110° to 1120° C.). At the same contact time (0.03 second) a total conversion of fluoroform to products of 79.1% was obtained distributed as folllows:

| Product | Percent conversion | Percent yield |
|---|---|---|
| $CF_2=CF_2$ | 52.7 | 66.5 |
| $C_2HF_5$ | 0.3 | 0.4 |
| $C_3F_8$ | 0.2 | 0.3 |
| $CF_3CF=CF_2$ | 20.4 | 25.8 |
| $CF_2=CF_2+CF_3CF=CF_2$ | 73.1 | 92.3 |
| Perfluoro $C_4$ compounds | 1.0 | 1.3 |
| Perfluoroisobutylene | 1.2 | 1.5 |
| $C_2F_6$ | 3.3 | 4.2 |

EXAMPLE 61

This example illustrates the recycling of unconverted fluoroform and tetrafluoroethylene in the production of perfluoropropene. In a first pass, essentially 100% fluoroform is passed through a platinum lined nickel tube 32"

long having an inside diameter of 6 millimeters. The tube is electrically heated and maintained at an average temperature of approximately 1000° C. over an estimated tube length of 9 inches, giving a reactor volume (volume at 1000° C.) of 6.3 milliliters. A sodium fluoride scrubber and product recovery system is employed as described in the previous examples. The entire system including product recovery and reactor is held at a pressure of 100 mm. Hg. At a contact time of 0.1 second, a total conversion of approximately 50% of the fluoroform to products is obtained, the yields on this first pass of $CF_2=CF_2$ and $CF_3CF=CF_2$ being 73% and 25% respectively for a total yield of $C_2F_4+C_3F_4$ of 98%.

The reaction product is distilled and the lowest boiling fraction, having a boiling point of about −82° C. to −70° C., containing a mixture of fluoroform and tetrafluoroethylene in the molar ratio of approximately 7:3 is repassed through the reactor at approximately the same conditions as the first pass. A total conversion of about 60% is obtained; the yields of $C_2F_4$ and $C_3F_6$ being about 40% and 55% respectively.

As is apparent from the foregoing description, many modifications of the invention are possible and it is to be understood that the specific embodiments described are for the purpose of illustration and that the invention is not to be limited thereto.

We claim:

1. A method for converting fluoroform to other fluorocarbons which comprises pyrolyzing fluoroform at a temperature of from 700° C. to 1500° C.

2. A method for converting fluoroform to other fluorocarbons which comprises pyrolyzing fluoroform at a temperature of from 850° C. to 1300° C.

3. A method for converting fluoroform to perfluoroolefins which comprises pyrolyzing fluoroform at a temperature of from 700° C. to 1500° C.

4. A method for converting fluoroform to perfluoroolefins selected from the class consisting of tetrafluoroethylene and perfluoropropene which comprises pyrolyzing fluoroform at a temperature of from 700° C. to 1500° C., at a pressure not greater than one atmosphere.

5. A method for converting fluoroform to perfluoroolefins selected from the class consisting of tetrafluoroethylene and perfluoropropene which comprises pyrolyzing fluoroform at a temperature of from 850° C. to 1300° C. at a pressure of not greater than atmospheric and at a contact time of not greater than about one second.

6. A method for producing tetrafluoroethylene which comprises pyrolyzing fluoroform.

7. A method for producing perfluoropropene which comprises pyrolyzing fluoroform.

8. A method for converting fluoroform to other fluorocarbons which comprises passing fluoroform through a tube heated to a temperature of from 700° C. to 1500° C.

9. A method for converting fluoroform to perfluoroolefins which comprises passing fluoroform through a tube heated to a temperature of 850° C. to 1300° C.

10. A method for converting fluoroform to perfluoroolefins selected from the class consisting of tertafluoroethylene and perfluoropropene which comprises passing fluoroform through a tube heated to a temperature of 850° C. to 1300° C. at a pressure not greater than one atmosphere and a contact time of not greater than one second.

11. A method for production of tertafluoroethylene which comprises pyrolyzing fluoroform at a temperature of from 900° C. to 1200° C. at a contact time of not greater than one second and at a pressure of not greater than one atmosphere.

12. A method for the production of tetrafluoroethylene which comprises passing fluoroform through a heated tube at a temperature of from 900° C. to 1200° C. at a contact time of 0.5 to 0.001 second and at a pressure of from 25 to 300 mm. Hg absolute.

13. A method for converting fluoroform to perfluoropropene which comprises passing fluoroform through a heated tube at a temperature of from 900° C. to 1200° C. at a contact time of not greater than one second and under a pressure of not greater than one atmosphere.

14. A method for converting fluoroform to perfluoropropene which comprises passing fluoroform through a tube heated to a temperature of from 900° C. to 1200° C. at a contact time of from 0.5 to 0.001 second and at a pressure of 25 to 300 mm. Hg absolute.

15. A method for converting fluoroform to perfluoropropene which comprises passing fluoroform through a tube heated to a temperature of 850° C. to 1300° C. at a contact time of not greater than one second and at a pressure of not greater than one atmosphere, separating a mixture of fluoroform and tetrafluoroethylene from the pyrolysis products and recycling said mixture for further pyrolysis and conversion to perfluoropropene.

16. A method for converting fluoroform to perfluoropropene which comprises passing fluoroform through a tube heated to a temperature of from 900° to 1200° C. at a contact time of from 0.5 to 0.001 second and at a pressure of from 25 to 300 mm. Hg absolute, separating a mixture of tetrafluoroethylene and fluoroform from the pyrolysis products and recycling said mixture to the reactor for further pyrolysis and conversion to perfluoropropene.

References Cited in the file of this patent

UNITED STATES PATENTS 2,551,573   Downing et al. _____ May 8, 1951